Feb. 4, 1936. F. MARKOWICZ 2,029,665
SCRIBER INDICATOR
Filed June 4, 1932
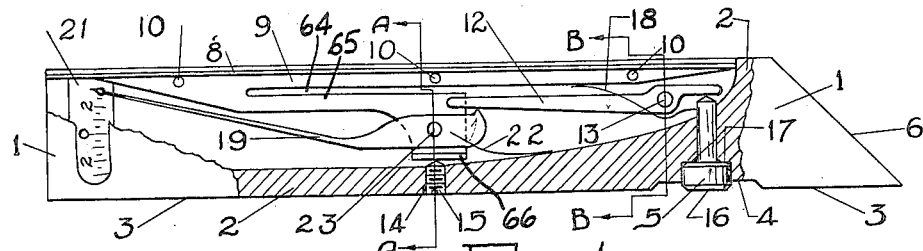
Fig. 1
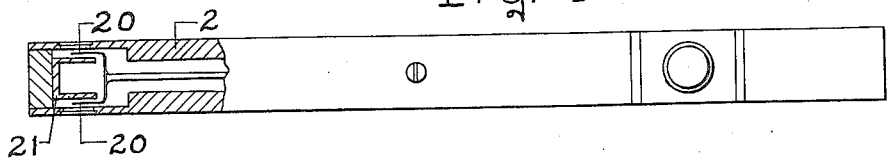
Fig. 2.
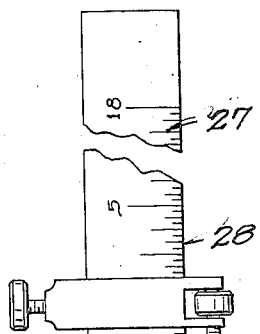
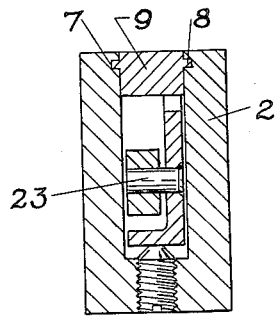
Fig 3.    Fig. 4.
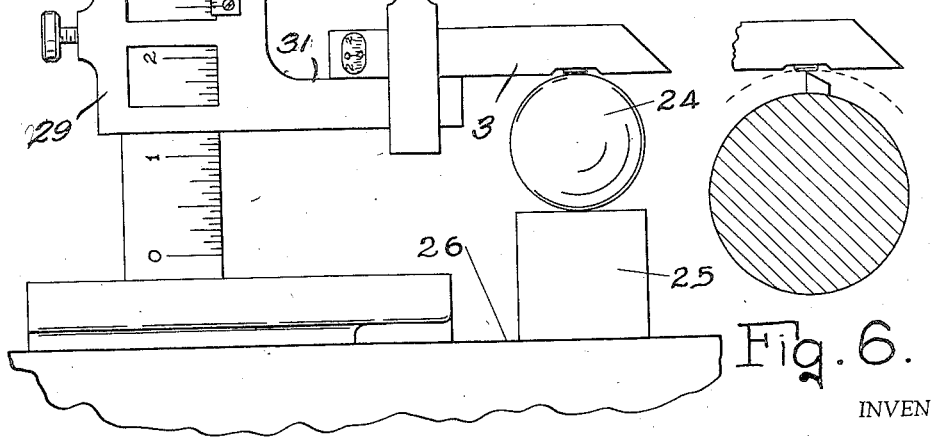
Fig. 5.    Fig. 6.
INVENTOR.
Frank Markowicz Patented Feb. 4, 1936

2,029,665

UNITED STATES PATENT OFFICE 2,029,665

SCRIBER INDICATOR

Frank Markowicz, Detroit, Mich.

Application June 4, 1932, Serial No. 615,377

5 Claims. (Cl. 33—172)

This invention has to do with precision measuring instruments used in the machine trades. It is particularly applicable to height gauges, vernier calipers, and the like, in which the object to be measured is located in such a way that a jaw of the instrument is forced against the object to be compared and the resulting position of the jaw read off a scale on the instrument. While scales are made very accurately and when used in connection with vernier scales great precision in the relative position of the jaws is indeed obtainable, yet the jaws are usually moved by some screw device which in turn is moved by the operator's hands and the pressure applied against the object must of necessity vary from one application to another. Consequently a man will read different lengths for the same object at different times and of course if different men are employed the variation is liable to be still greater. Due to the minuteness of the distances involved in modern machining it is easy to spring the measuring instrument an amount that makes the reading valueless and it is correspondingly difficult to always apply the identical pressure on the screw of the measuring device. Due to the mechanical advantage of the screw, the pressure brought to bear on the jaw can readily vary within wide limits while the pressure exerted by the operator has not varied a great deal. These forces tend to bend the jaws especially and as a consequence the position relationship of the reference surface on the jaw of the instrument with the point at which the reading is taken on the scale is altered depending upon the amount of the bending. Depending upon its nature, the work being measured is sometimes subject to bending due to the pressure of the measuring jaw thus aggravating the already bad condition. This device is designed to eliminate this human variable in this class of measurements.

In adjusting an ordinary height gauge to a height on another gauge or on work, it is comparatively easy to raise the front edge of the base of the gauge off the surface plate on which the height gauge ordinarily is used, thus again vitiating any reading that may be taken. In using this scriber indicator the force required to move the indicating hand is less than that required to lift the front end of the height gauge and consequently as the user advances the indicator toward the work by means of the advancing screw (see Fig. 5) the indicator gives visible indication of the alignment of the point being measured with the reference surface before sufficient force can be applied to lift the front edge of the height gauge off the surface plate and the user can be certain that the reading of the vernier on the height gauge scale is correct when the pointer of the indicator is over the zero mark of the indicator.

The indicator scriber is particularly applicable to layout work in connection with a height gauge. Here the scriber can be set on a gauge and the dimension transferred to the work without further manipulation. The movable surface of the scriber is flat so that it is comparatively easy to find the highest point of a sphere or the highest line on a cylinder. By the use of this indicator in making adjustments of tool or cutter in a boring bar, it is easy to find the highest point in the rotation of the tool.

The invention pertains to improvements in precision measuring instruments used in the machine trade. The primary object being the provision of a member for contacting the thing to be measured and having an indicating device showing when a point of the measured object and the surface contacting the point are in exact alignment with a reference plane or surface on this contacting member.

It is a further object of this invention to provide a contacting member for gauges adapted to visibly indicate the pressure existing between the contacting member and the object being measured.

It is a further object to provide a scriber point in connection with the reference surface thereby providing a ready means for scribing the measurement onto surfaces.

These and further objects will be obvious to one familiar with the art on a further study of the following specification and drawing.

Figure 1 is a partial section showing the arrangement of the parts.

Figure 2 is a view of the reference surface side of the scriber, partially cut away to show the arrangement of the pointers on both sides of the instrument.

Figure 3 is a section taken at A A of Figure 1.

Figure 4 is a section at B B of Figure 1.

Figure 5 is a view of the scriber as applied to a height gauge in measuring the diameter of a sphere.

Figure 6 shows the indicator, partially cut away, set to find the highest point in the rotation of a tool in a boring bar.

Similar numerals refer to similar parts throughout the drawing.

Referring to Figure 1, the scriber 1 comprises a solid steel body part 2, which is finished smooth and true and has on the bottom a very flat and accurate hardened surface 3, here called the reference surface or plane. The back of the scriber 2 is also ground parallel with the reference surface 3, and it is slotted out to receive the mechanism. There is an indenture 4 in this reference surface 3 in which an opening is bored to receive the movable contacting member 5. At the front of the scriber a scribing edge is produced by grinding the face 6 at an angle with the reference surface. Near the back surface along the inside faces of a slot are formed grooves 7 to receive the tongues 8 of the frame 9, see Figure 3. There are also holes in the body for the frame supporting rivets 10, as well as a drilled and tapped hole 11 for the bearing bolt 13 forming the bearing of the primary lever 12, see Figures 1 and 4. There is also a drilled and tapped hole 14 for the pointer adjusting screw 15.

The movable member 5 is cylindrical and accurately ground on two diameters fitted closely to the bored opening in body 1. On its bottom face 16 is ground the surface that contacts the work to be tested. The face 16 of member 5 is hardened and moves always in parallel relationship with respect to reference surface 3. In member 5 where the large diameter reduces to the smaller is a ground ring that abuts a seat 17 in the steel body 2 forming a stop so that excessive pressure cannot force the plunger 5 farther back than a predetermined amount so as to protect the mechanism. The smaller diameter of the plunger 5 projects through the body 2 and engages with the primary lever 12. There is also a hole near the top of this plunger 5 to receive a spring 18 bent to keep the plunger drawn in against the heel of lever 12, and at the same time this spring 18 would need to be sheared before the plunger 5 could be removed from the scriber-indicator.

The primary lever 12 is hinged on the bearing bolt 13. It projects over the point of the plunger on one side of the bearing and over the contacting wedge of the indicating lever on the other side. It is slotted to receive spring 18.

This spring 18 tends to turn the lever 12 in an anticlockwise direction about its bearing 13 and at the same time the end that is embedded in the plunger 5 tends to pull that member into the scriber.

The indicating lever 19 is hinged about a stud 23 held in the frame 9. Close to the bearing is an upwardly pointed wedge shaped projection that contacts the primary lever. On the side opposite the wedge extends the pointer or indicator. Near the end it divides into two parts carrying the pointers 20 so as to be visible on both sides of the instrument. The lever is slotted to receive spring 22 which tends to swing the lever in an anticlockwise direction about the stud 23. See Figure 1. The spring 22 is, of course, of considerably greater tension and strength than the spring 18 on account of the greater work which the spring 22 is required to perform.

The frame 9 is shaped to close the opening slotted out of the back of member 2. It has tongues 8 fitted into grooves 7 of the body 2 to keep the frame in place. It also is drilled for rivets 10 which prevents the sliding of the frame. It also carries the scale 21. The stud for the indicating lever is held by an extension of the frame forming a spring mounting, this mounting pressing against the adjusting screw 15.

The scale 21 is visible through windows in the side of the scriber and can be directly welded or riveted to the frame 9.

While the pointer or indicator of the device has a scale over which it moves, it is intended that the pointer be set at zero when the movable surface is in the same plane as the reference surface of the scriber. The pointer indicates positions directly; that is at "0" the inference is that the movable plane of the scriber coincides with the reference plane, but it must also be taken into account that the springs have been compressed a given distance and therefore stressed a definite amount and thus react with a definite back thrust which is proportional to the extent of the movement and is always the same for the same amount of movement and is therefore a definite value at every point on the dial of the indicator. Since the stress strain relationship in steel springs under these operating conditions is stable, and as the springs are not overloaded, the thrust values at each position of the pointer will not be subject to variation from time to time. Therefore as long as the operator brings the pointer to zero he automatically exerts a fixed pressure on the instrument and on the object being measured which will be the same every time he or another measures the object and thus the readings of measurement will be uniform.

The purpose of the adjusting screw 15 is to change the position of the indicating lever 19 relative to the primary lever 12 and thereby allowing the pointers to be brought to "0" when the face 16 is in the plane of the surface 3. The frame 9 is slitted as at 64 to provide the elongated arm 65 which has the downwardly projecting plate-like head 66. Projected through this head 66 and through the member 19, so as to serve as a pivot therefor, is a pin 23. The frame 9 is formed from sufficiently resilient material so that there is a spring characteristic or a resiliency in the arm 65 which serves to normally retain the plate-like head 66 bearing against the screw 15. As the screw 15 is threaded inwardly, it will force the arm 65 to move into approach relatively to the frame 9, thus narrowing the slit 64. This movement carries the head 66 inwardly, which, of course, carries the mounted end of the pointer inwardly. Consequently, the bearing for the pointer 19 is moved and the lever 12 remaining stationary, the pointer 19 will rotate about the pin 23 in a clockwise direction. This adjustment would, of course, continue until the pointer 19 had been moved to the desired position as indicated by the graduations.

In Figure 5 the scriber is shown in use, being set up over a sphere 24 on a gauge block 25, in which position any diameter of the sphere can be readily checked. The height found can then be directly scribed by the point on a vertical surface in the customary manner without further adjustment of any kind. The vertical scale 27 of the height gauge has a straight edge 28 on which the sliding attachment 29 moves. This attachment has means for locating itself with regard to the scale 27 in the vernier scale 30 which is fastened to the sliding attachment. The scale 27, incidentally, always bears a definite position relationship with the base surface of the height gauge. An object one inch in height placed under the reading or reference surface of the sliding attachment and on the plane of the base causes the vernier reading to be one inch. The surface 31 of the attachment is perpendicular to the straight edge 28. The scriber indicator is located on the attachment with its reference surface 3 against the surface 31. Hence, the surface 3 is maintained perpendicular to the straight edge 28.

In Figure 6 the indicator is being used to find the highest point in the rotation of a tool in a boring bar, convenient in making adjustments to the tool.

It is also contemplated using the indicator on the fixed jaw of measuring instruments as well as on the movable jaw of the height gauge as shown in Figure 5.

This indicator is in some respects similar to a depth gauge, differentiating therefrom by the fact that movement of the plunger in this device is comparatively short, say from .003 to .005 inches either side of the "0" position which is a much too restricted range for a depth gauge. Also on this indicator the reference surface need not extend on both sides of the contacting member.

The recess 4 allows an object larger than the contacting surface of member 5 to pass into the body beyond the reference plane which is convenient when using the indicator on cylinders, and narrow flat surfaces, etc.

I claim:

1. An indicator comprising a hollow body having a flat reference surface and a scribing point at one end of said reference surface; a member movable into and relative to said body, a plane surface for contacting objects to be measured on said moving member, said plane surface being adapted to move in parallel relationship with said reference surface, means to amplify the movement and means for indicating the amplified movement of said movable plane surface with regard to said reference surface and said scribing point.

2. The combination comprising an indicator having a hollow body with a flat reference surface and a scribing point at one end of said reference surface; a member movable into and relative to said body, a plane surface for contacting objects on said movable member, said plane surface being adapted to move in parallel relationship with said reference surface; means for indicating the position of said movable plane surface relative to said reference surface and said scribing point; and a distance measuring device including a graduated straight edge and means slidable on said straight edge for holding said indicator, with said reference surface held substantially perpendicular to the straight edge on said measuring device, and the slidable means including means for locating the position of said reference surface relative to said scale.

3. An indicator of the class described, comprising: a hollow body; a frame mounted in said body, said frame being slitted throughout a portion of its length to provide a pair of spaced parts, one of said parts constituting an elongated arm; a lateral plate-like projection on the end of said arm; a pointer pivotally mounted adjacent one end of said projection; and means threadable into said body for engaging said plate for flexing said arm inwardly against the resiliency of said frame; and means engageable with one end of said pointer for rocking the same upon inward threading of said threadable means.

4. An indicator of the class described, comprising: a hollow body; a frame mounted in said body, said frame being slitted inwardly from one end to provide an elongated arm separated from the main body of said frame; a pointer pivotally mounted at one end of said arm; and means threadable into said body for engaging the free end of said arm and moving the same inwardly towards said frame; and means engageable with said pointer for rocking the same upon the threading of said threadable means inwardly and outwardly of said body.

5. In an indicator of the class described, a hollow housing; a scale mounted on said housing and visible through openings formed in opposite sides thereof; a frame mounted in said housing; an elongated arm projecting outwardly from said frame and normally spaced therefrom at its outer end, said frame and said arm being formed from resilient material; a pointer pivotally mounted on said arm; a pair of spaced indicating portions on the free end of said pointer embracing said scale, each being visible through one of said openings; threaded means mounted on said housing and engageable with the free end of said arm for adjusting the position of the same at its free end relative to said frame; and means engageable with said pointer adjacent its pivoted end for rocking the same on its pivot upon the actuation of said adjusting means.

FRANK MARKOWICZ.